US009652777B2

(12) United States Patent
Tapley et al.

(10) Patent No.: US 9,652,777 B2
(45) Date of Patent: May 16, 2017

(54) SELF OPTIMIZING AND REDUCING USER EXPERIENCES

(71) Applicants: John Tapley, Santa Clara, CA (US); Krystal Rose Higgins, Sunnyvale, CA (US); Eric J. Farraro, San Jose, CA (US)

(72) Inventors: John Tapley, Santa Clara, CA (US); Krystal Rose Higgins, Sunnyvale, CA (US); Eric J. Farraro, San Jose, CA (US)

(73) Assignee: eBay Inc., San Jose, CA (US)

( * ) Notice: Subject to any disclaimer, the term of this patent is extended or adjusted under 35 U.S.C. 154(b) by 252 days.

(21) Appl. No.: 13/681,653

(22) Filed: Nov. 20, 2012

(65) Prior Publication Data

US 2014/0143694 A1    May 22, 2014

(51) Int. Cl.
| | | |
|---|---|---|
| *G06F 3/0481* | (2013.01) | |
| *G06Q 30/02* | (2012.01) | |
| *G06F 9/44* | (2006.01) | |
| *G06Q 30/06* | (2012.01) | |
| *G06Q 30/08* | (2012.01) | |

(52) U.S. Cl.
CPC ....... *G06Q 30/0241* (2013.01); *G06F 3/0481* (2013.01); *G06F 8/38* (2013.01); *G06Q 30/06* (2013.01); *G06Q 30/08* (2013.01)

(58) Field of Classification Search
CPC .... G06F 3/048; G06F 3/0481; G06Q 30/0241
USPC .......................................................... 715/765
See application file for complete search history.

(56) References Cited

U.S. PATENT DOCUMENTS

| | | | |
|---|---|---|---|
| 6,959,319 B1 * | 10/2005 | Huang | G06F 17/30867 705/14.73 |
| 2002/0084991 A1 * | 7/2002 | Harrison et al. | 345/173 |
| 2008/0126476 A1 * | 5/2008 | Nicholas et al. | 709/203 |
| 2008/0178098 A1 * | 7/2008 | Yoon | G06F 3/0489 715/762 |
| 2008/0209349 A1 * | 8/2008 | Macadaan | G06F 3/0482 715/762 |
| 2012/0029661 A1 * | 2/2012 | Jones et al. | 700/17 |
| 2014/0035835 A1 * | 2/2014 | Zhang et al. | 345/173 |

* cited by examiner

*Primary Examiner* — Jennifer To
*Assistant Examiner* — Ashley Fortino
(74) *Attorney, Agent, or Firm* — Schwegman, Lundberg & Woessner, P.A.

(57) ABSTRACT

In an example embodiment, a method of dynamically optimizing a user interface on an electronic device is provided. A user interface is presented to a user, wherein the user interface includes one or more elements. User interactions with the one or more elements are then measured. The one or more elements of the user interface are then dynamically modified based on the measured user interaction.

20 Claims, 9 Drawing Sheets

SELF OPTIMIZING AND REDUCING USER EXPERIENCES

BACKGROUND

User experience is a broad term covering many aspects of experiences of users with computing products or services accessed through the computing products (such as web sites). The user experience includes not only the user interface, but also the graphics and physical interaction. For the most part, such user experience is somewhat static in nature. The layout of a website is generally the same for most or all users who access it, until such time as the web designer alters the layout. To the extent that different users are served different layouts, they are generally distributed based on preset criteria (such as hardware specifications of the user device).

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, various aspects of a user experience are dynamically optimized in order to provide a customized and efficient experience for the user. Elements within a user interface, such as button size, advertising sizing, font, color, placement, the presences of certain interface objects, etc., can all be dynamically altered based on usage information as well as other factors (e.g., demographic information, information from user profiles, etc.). For example, a search bar displayed on a web site may change in size and location on the screen based on how often the user utilized the search bar. In the extreme, all elements but the search bar could be removed for users who primarily use the web site for searches.

In another example embodiments, the usage information is gathered from touchscreen usage on a user device. Key presses indicating where a user has pressed a touchscreen with his or her finger (or stylus) may be tracked to determine the frequency of presses on various elements of the user interface and areas of the touchscreen. This information may then be used to dynamically modify the user interface, by atrophying out lesser used elements and areas and introducing in new elements.

The dynamic adjustment may be performed by the local user device, or may be performed at the server-level by, for example, a web server. In some embodiments, a combination of local user devices and one or more servers may be used to perform the dynamic adjustment.

Figure 1:
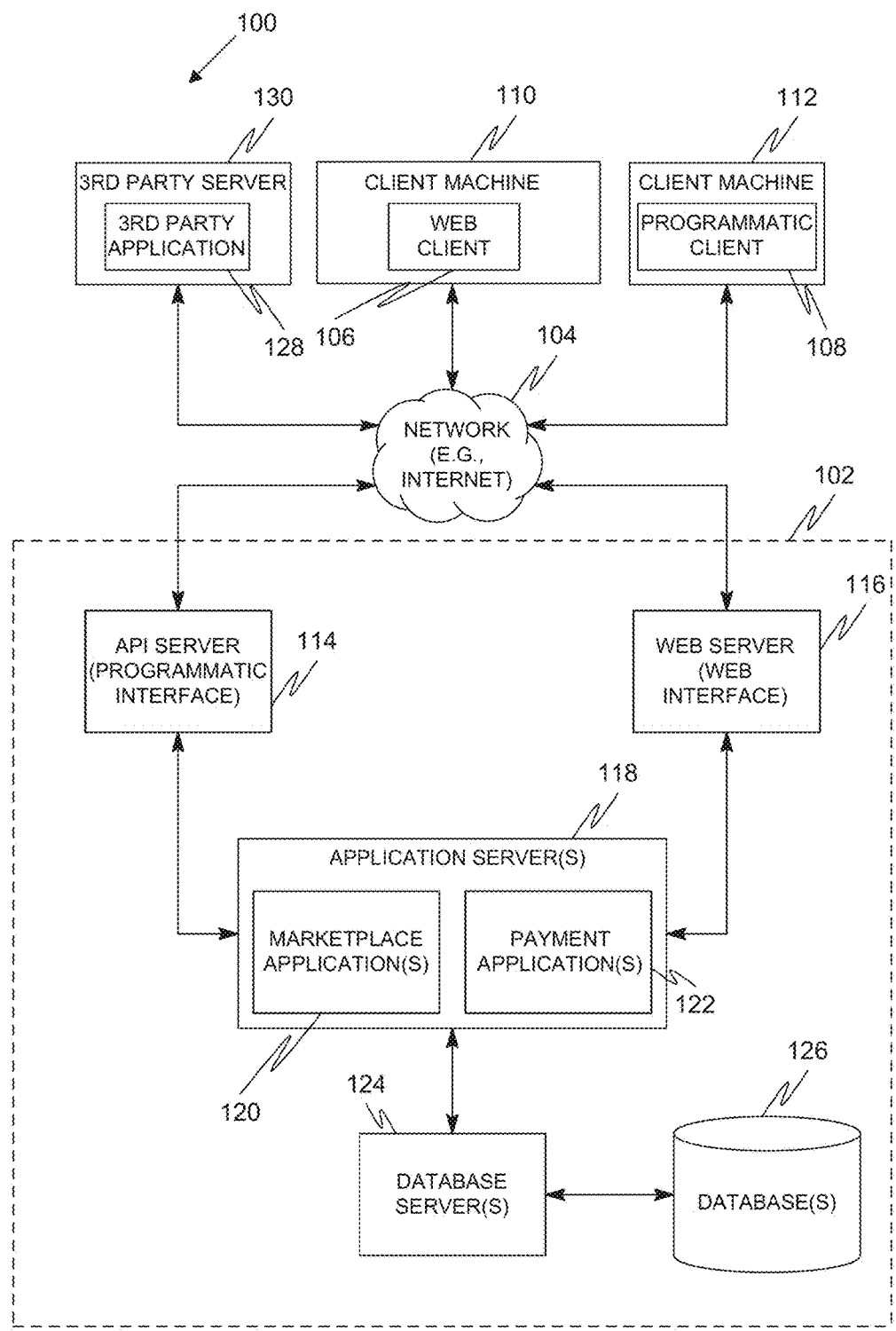
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later o redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
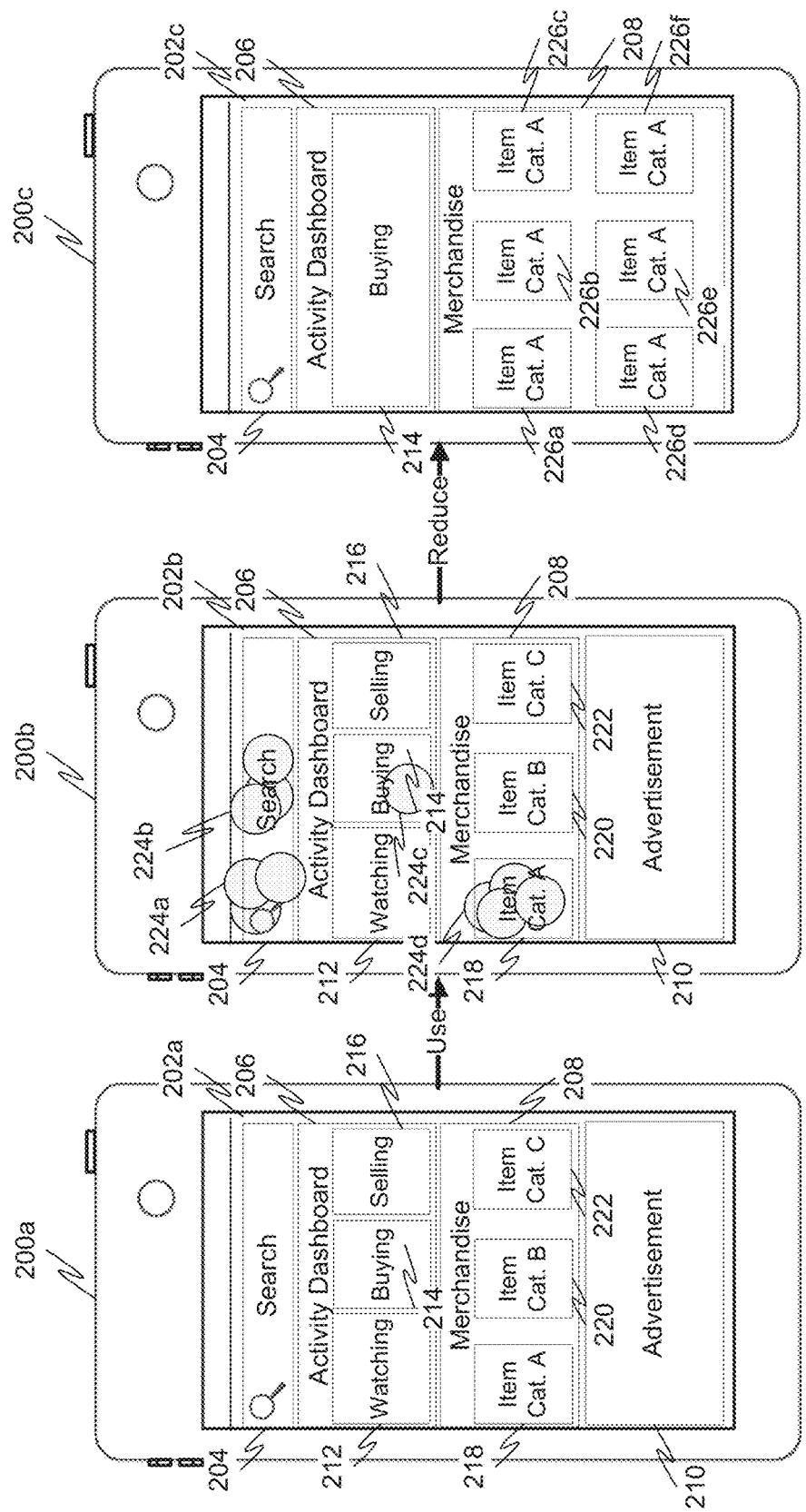
FIG. 2 is a diagram illustrating a progression, in accordance with an example embodiment, of dynamic alteration of a user interface.

FIG. 2 is a diagram illustrating a progression, in accordance with an example embodiment, of dynamic alteration of a user interface. Pictured here are a mobile device 200a, 200b, 200c in three states. It should be noted that while a mobile device is depicted, a similar process could run on any electronic device. Beginning with the mobile device 200a in the first state, it can be seen that the user interface 202a has various sections, including a search bar 204, an activity dashboard 206, a merchandise area 208, and an advertisement 210. For discussion purposes, this may be referred to as a default or beginning layout, although since the methods described herein are dynamically applied, there need not be any state that is strictly known as a default or beginning layout because the layout my simply be continuously adjusted. The user interface 202a here may depict an interface to an online auction web site, although one of ordinary skill in the art will recognize that this disclosure can apply to other types of user interfaces as well.

Within the activity dashboard 206 are three activities: watching 212 (for items in the online auction the user has selected as being of interest), buying 214 (for items in the online auction the user has bid on), and selling 216 (for items in the online auction the user is selling).

Within the merchandise area 208 may be a number of items 218, 220, 222. Here the items depicted are in separate categories, labelled as categories A, B, and C. For example, category A may be automobiles, category B may be toys, and category C may be books. The system may display, for example, a single item for each category representing the item in the category that is likeliest to be of interest to the user (based, perhaps, on previous purchases or searches).

Turning to mobile device 200b, which is in the second state, the user has begun to use the user interface 202b by selecting various of the sections of the user interface 202b. Depicted here is use by pressing on a touchscreen of the mobile device 200b. Various circles and circle groupings 224a-224d represent "presses," namely areas of the user interface 202b that the user has selected. Of course, it is not necessary that the user interface 202b be operated on a touchscreen display, and other types of user interaction may be measured other than "presses" on a touchscreen, such as clicks using a mouse or other input device.

As can be seen by the patterns of circles and circle groupings 224a-224d, the user has selected on the search bar 204 a number of times, on the buying activity 214, and also selected on category A merchandise items 218.

The system may track these interactions and adjust the user interface to better align with the user's apparent interests and usage preferences. Specifically, referring to mobile device 200c, which is the third state, the system here may dynamically adjust the activity dashboard 206 in the user interface 202c so that only a buying activity 214 is depicted, since the user has expressed little or no interest in the watching activity 212 or selling activity 216. The system may also remove the advertisement 210, since the user has expressed little or no interest in that, and expand the merchandise area 208 to compensate, allowing for more items 226a-226f to be displayed. Lastly, given that the user has expressed interest in merchandise from category A (as evidence from the presses on item 218), the merchandise area 208 may be reconfigured to only display items 226a-226f from category A. The result is a custom designed interface that has been dynamically and automatically reconfigured to the user's needs.

Figure 3:
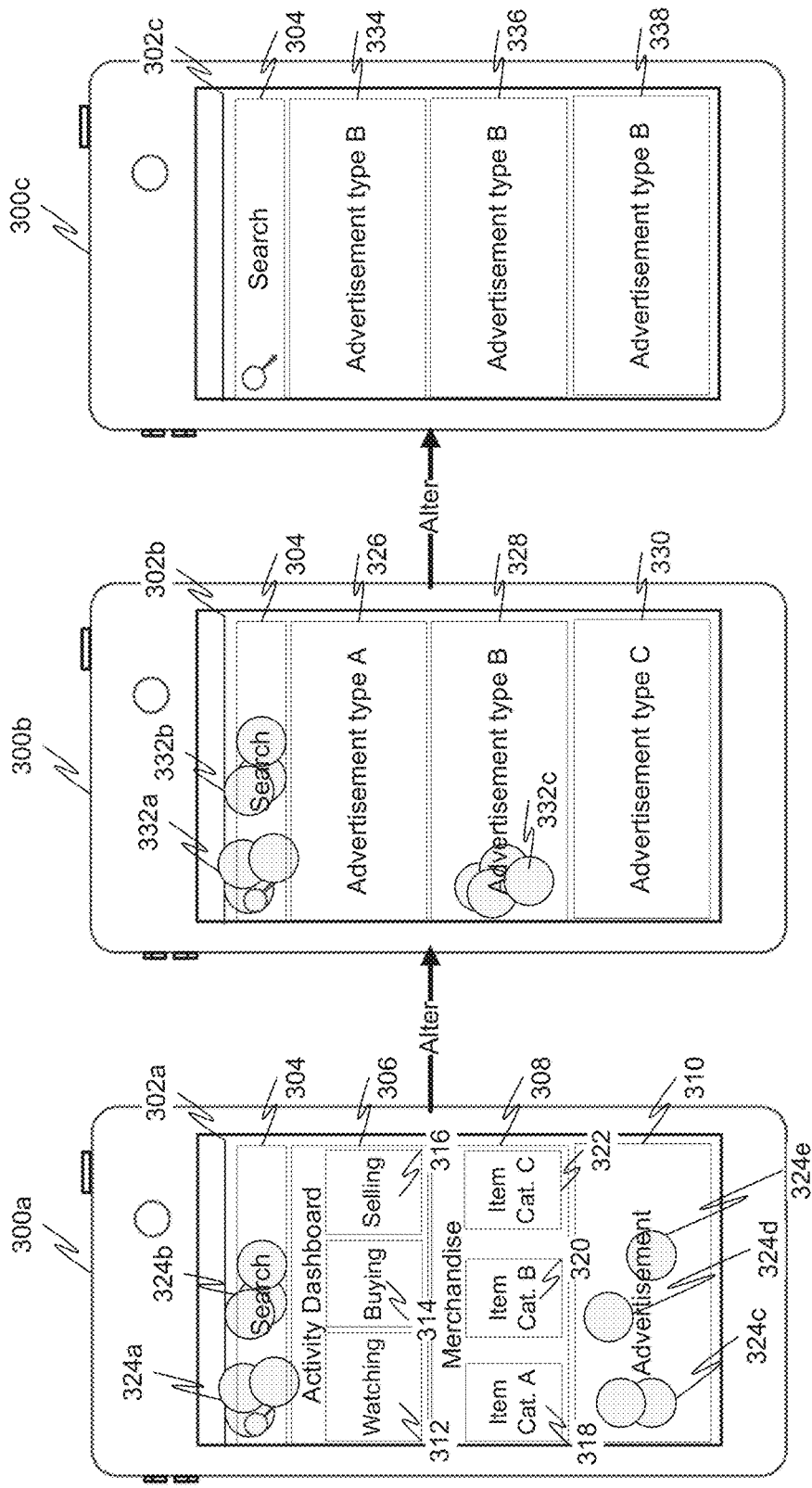
FIG. 3 is a diagram illustrating a progression, in accordance with another example embodiment, of dynamic alteration of a user interface.

FIG. 3 is a diagram illustrating a progression, in accordance with another example embodiment, of dynamic alteration of a user interface. Here, depicted are three states of the mobile device 300a, 300b, 300c. The user interface 302a may include a search bar 304, an activity dashboard 306, a merchandise area 308, and an advertisement 310. Within the activity dashboard 306 are three activities: watching 312 (for items in the online auction the user has selected as being of interest), buying 314 (for items in the online auction the user has bid on), and selling 316 (for items in the online auction the user is selling). Within the merchandise area 308 may be a number of items 318, 320, 322. As shown by circles and circle groupings 324a-324e, the user has selected on the search bar 304 and the advertisement 310, but not the other items of the user interface 302a. The system may then dynamically alter the user interface 302a into the user interface 302b of mobile device 300b, which is the second state. Here, the search bar 304 remains, but the activity dashboard 306 and merchandise area 308 have been removed, in favor of advertisements 326-330, which represent advertisements of different types. The "type" of the advertisement may, in fact, be any categorization useful to differentiate advertisements, including differentiations based on the category of the advertised item or service (e.g., automobile advertisement versus a drug advertisement), or based on the format of the advertisement (e.g., animated advertisement versus static advertisement).

As can be seen from the circles and circle groupings 332a-332c in the user interface 302b, the user has then subsequently continued to select on the search bar 304 as well as on type B advertisement(s) 328. The system may then respond by keeping the search bar 304 in the user interface 302c of the mobile device 300c in the third state, but replacing all advertisements 326, 328, 330 with advertisements 334-338 of type B.

Figure 4:
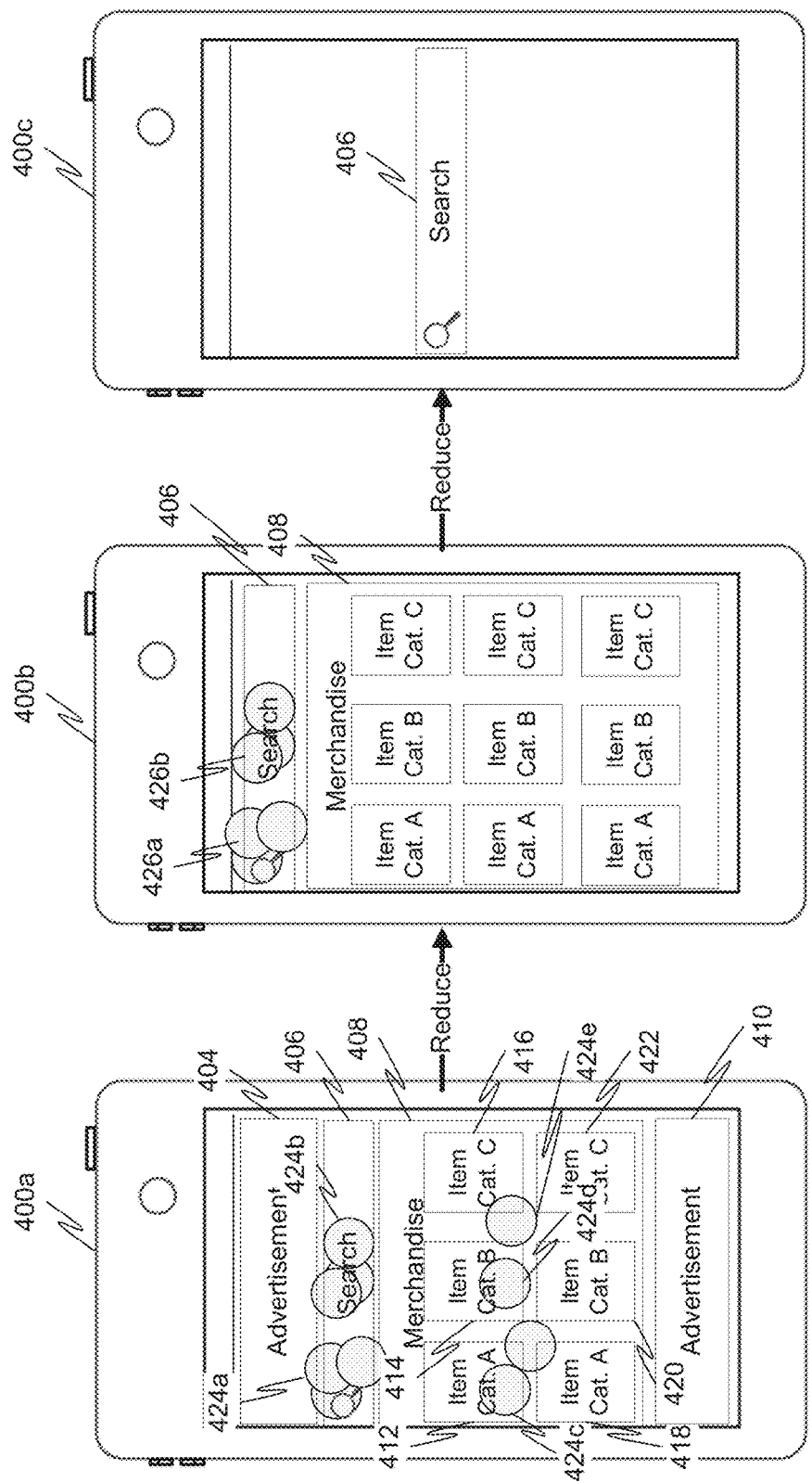
FIG. 4 is a diagram illustrating a progression, in accordance with another example embodiment, of dynamic alteration of a user interface.

FIG. 4 is a diagram illustrating a progression, in accordance with another example embodiment, of dynamic alteration of a user interface. Here, depicted are three states of the mobile device 400a, 400b, 400c. The user interface 402a may include a first advertisement 404, a search bar 406, a merchandise area 408, and a second advertisement 410. Within the merchandise area 408 may be a number of items 412-422. As shown by circles and circle groupings 424a-424e, the user has selected on the search bar 406 and the items 412-416 in the merchandise area 408, but not the other items 418-422 of the user interface 402a. The system may then dynamically alter the user interface 402a into the user interface 402b of mobile device 400b, which is the second state. Here, the search bar 406 and merchandise area 408 remain, but the advertisements 404, 410 have been removed. The merchandise area 408 has been expanded to compensate.

As can be seen from the circles and circle groupings 426a-426b in the user interface 402b, the user has then subsequently continued to select on the search bar 406. The system may then respond by removing all elements but the search bar 406 in the user interface 402c of the mobile device 400c in the third state. This has greatly simplified the interface for a user who is now, apparently, only interested in searching using the search bar 406.

Figure 5:
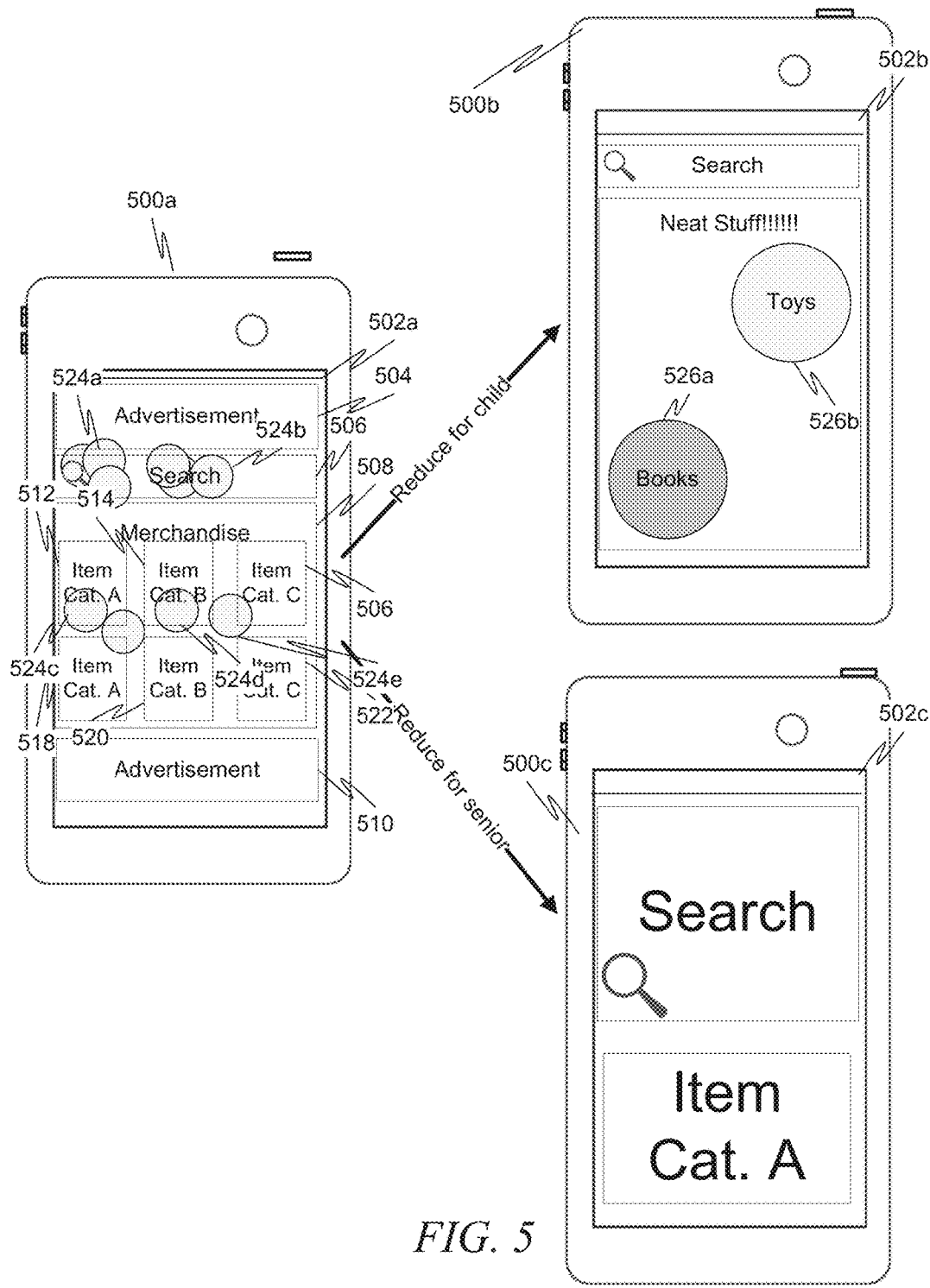
FIG. 5 is a diagram illustrating a progression, in accordance with another example embodiment, of dynamic alteration of a user interface.

In addition to basing its decision on user interactions, such as areas where the user has pressed, the system can also use other information in how to dynamically alter the user interface. Information about the user, such as demographic or user interest information gleaned from a user profile or other information source, can be used in altering the user interface as well. FIG. 5 is a diagram illustrating a progression, in accordance with another example embodiment, of dynamic alteration of a user interface. Here, the mobile device 500a in the first state includes a user interface 502a having a first advertisement 504, a search bar 506, a merchandise area 508, and a second advertisement 510. Within the merchandise area 508 may be a number of items 512-522. As shown by circles and circle groupings 524a-524e, the user has selected on the search bar 506 and the items 512-516 in the merchandise area 508, but not the other items 518-522 of the user interface 502a. Additionally, the system may then retrieve information about the user, such as the user's age. Here, two different states for the mobile device 500b, 500c are possible next states depending upon whether the system determines that the user is a child or a senior. In the mobile device 500b for the second state, if the user is a child, that information along with the previous interaction information from the circles and circle groupings 524a-524e leads the system to provide a user interface 502b designed for a child and also custom designed for this particular child. The child user interface may, for example, include bright colors, simplistic shapes (such as circles 526a, 526b), and language more appropriate for a child (such as replacing the word "Merchandise" with "Neat Stuff!" in the merchandise area 508.

Alternatively, if the system determined that the user was a senior, that information along with the previous interaction information from the circles and circle groupings 524a-524e leads the system to provide a user interface 502c designed for a senior and also custom designed for this particular senior. The senior interface may, for example, include very large font and increased areas for the search bar 506 and the merchandise area 508.

The above examples depict areas of the user interface being removed, but it is also possible to add areas of the user interface. In some instances, the areas may be added based on user interaction and various assumptions that can be made about a user (e.g., if a user uses a search bar a lot, he or she may wish to be presented with an additional search tool instead of a browsing tool). In other instances, areas that have been previously removed could be reintroduced to the user interface to gauge whether the user may now be interested in them. For example, a user's tastes may evolve over time, so that interest in certain categories of merchandise may wane and interest in other categories may grow. In order to capture this, merchandise from areas not necessarily known to be of interest based on previous interactions may be randomly introduced into the user interface, in order to allow the user to express interest in these categories. This may be extended not just to areas that were previously removed but new areas that have never been introduced as well.

Additionally, certain areas, such as advertisements, tend to lose their effectiveness with overuse. Users, over time, learn to ignore advertisements that appear on their user interface. As such, removing the advertisements only to reintroduce them at a later time allows the user to be "retrained" to notice the advertisements once again. The system may implement these and other strategies in determining how to dynamically alter the user interface.

Figure 6:
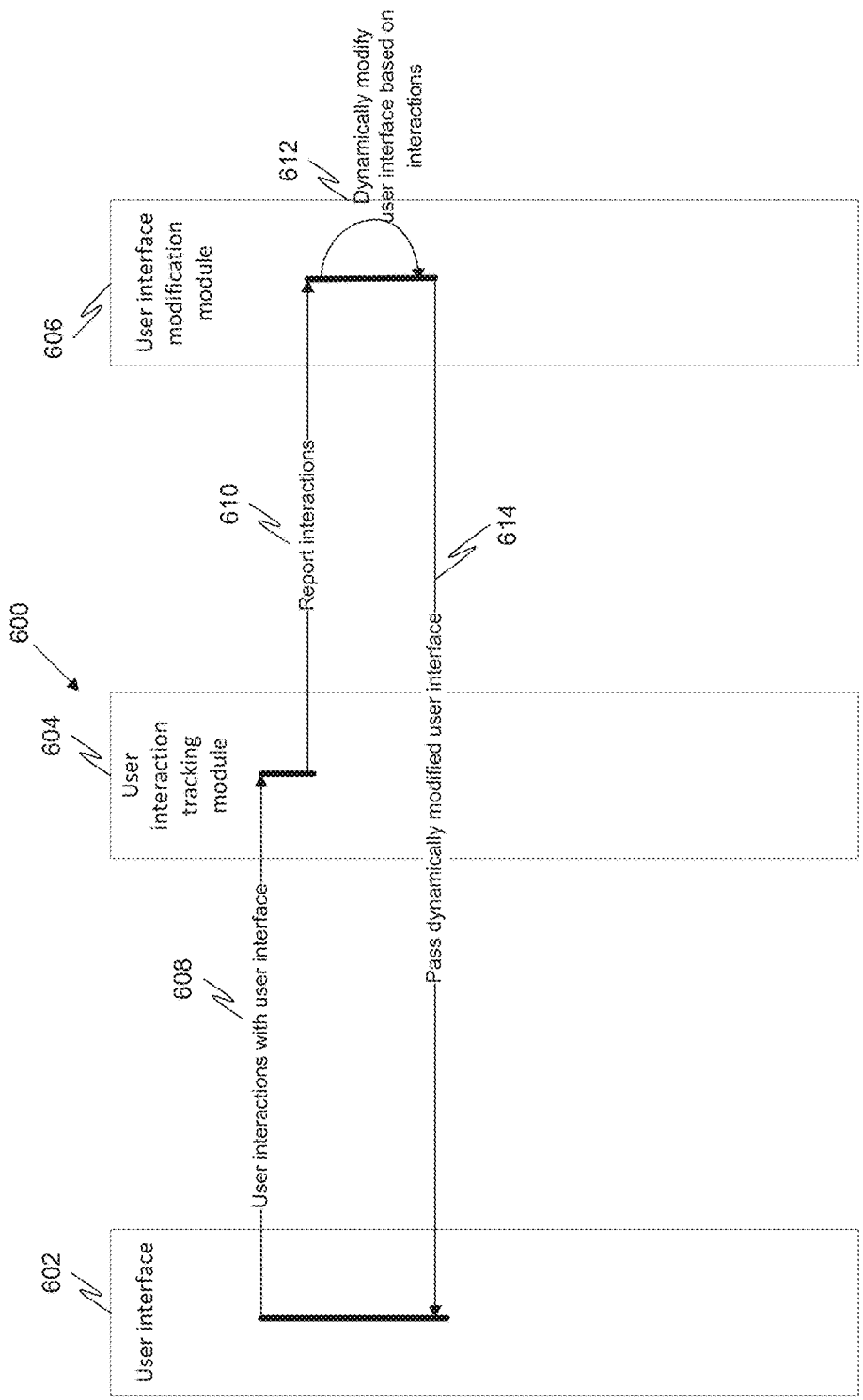
FIG. 6 is an interaction diagram illustrating a method, in accordance with an example embodiment, of dynamically altering a user interface.

FIG. 6 is an interaction diagram illustrating a method 600, in accordance with an example embodiment, of dynamically altering a user interface. In this method 600, a user interface 602 (which may be contained on an electronic device such as a mobile device) interacts with a user interaction tracking module 604. The user interaction tracking module 604 may be contained on the same user device as the user interface 602. A user interface modification module 606 may either be located on the same electronic device as the other components 602, 604, or may be located on another device, such as on a web server.

At operation 608, user interactions with the user interface 602 may be sent to the user interaction tracking module 604. Then at operation 610 these interactions are reported to the user interface modification module 606. This may occur in a number of ways. While the user interface 602 and user interaction tracking module 604 are depicted as separate components, in some embodiments the user interaction tracking module 604 is actually built into the user interface 602, such that the user interactions are automatically reported to the user interface modification module 606. The interactions may be logged and tracked. In some embodiments, a summary report may be generated to the user interface modification module 606 (e.g., the user has interacted with area A 69 times, area B 52 times, area C 0 times, etc.). In other embodiments, the raw data can be reported to the user interface modification module 606.

At operation 612 the user interaction modification module 606 may dynamically modify the user interface 602 based on the interactions. Of course, as described above, other factors, such as user demographic or interest information, could also be used in this dynamic modification. At operation 614, the dynamically modified user interface may be passed back. The whole process may then be repeated continuously, allowing for an always-up-to-date customized user interface 602. It should be noted that the dynamic modification may happen periodically, either using fixed periods (e.g., once an hour, once a day), or non-fixed periods, or even randomly. In other embodiments, the modification occurs when a certain number of interactions have been recorded (e.g., every 1000 interactions). If the periods are too short, it may be difficult to have tracked enough user interactions to be useful.

Figure 7:
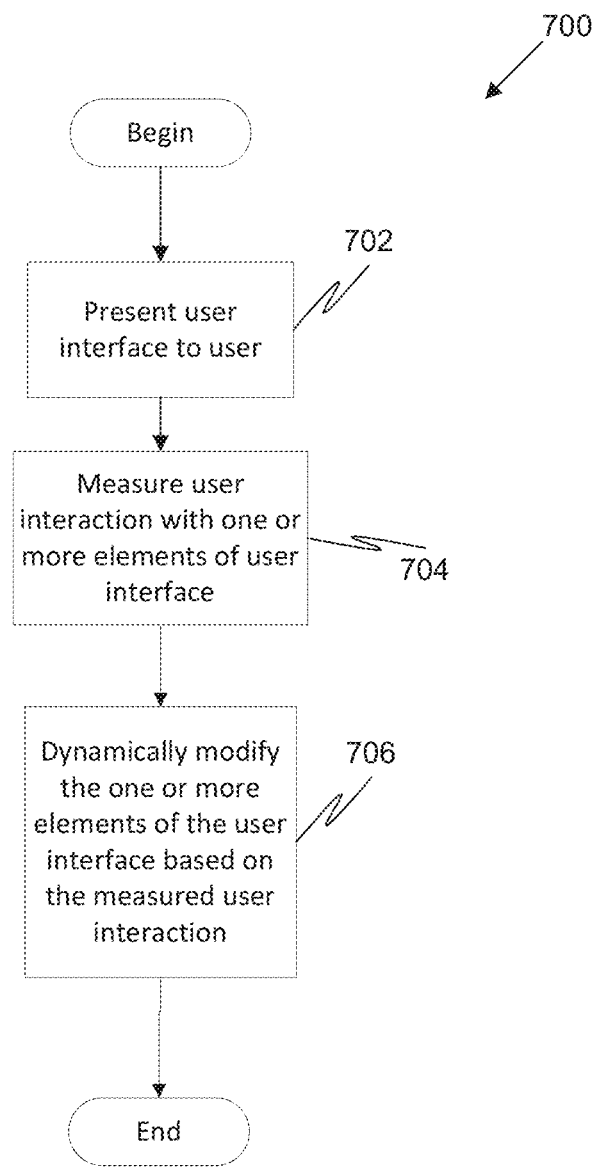
FIG. 7 is a flow diagram illustrating a method, in accordance with an example embodiment, of dynamically altering a user interface.

FIG. 7 is a flow diagram illustrating a method 700, in accordance with an example embodiment, of dynamically altering a user interface. At operation 702, a user interface is presented to a user. At operation 704, user interaction with one or more elements of the user interface is measured. At operation 706, one or more of the elements of the user interface are dynamically modified based on the measured user interaction.

Figure 8:
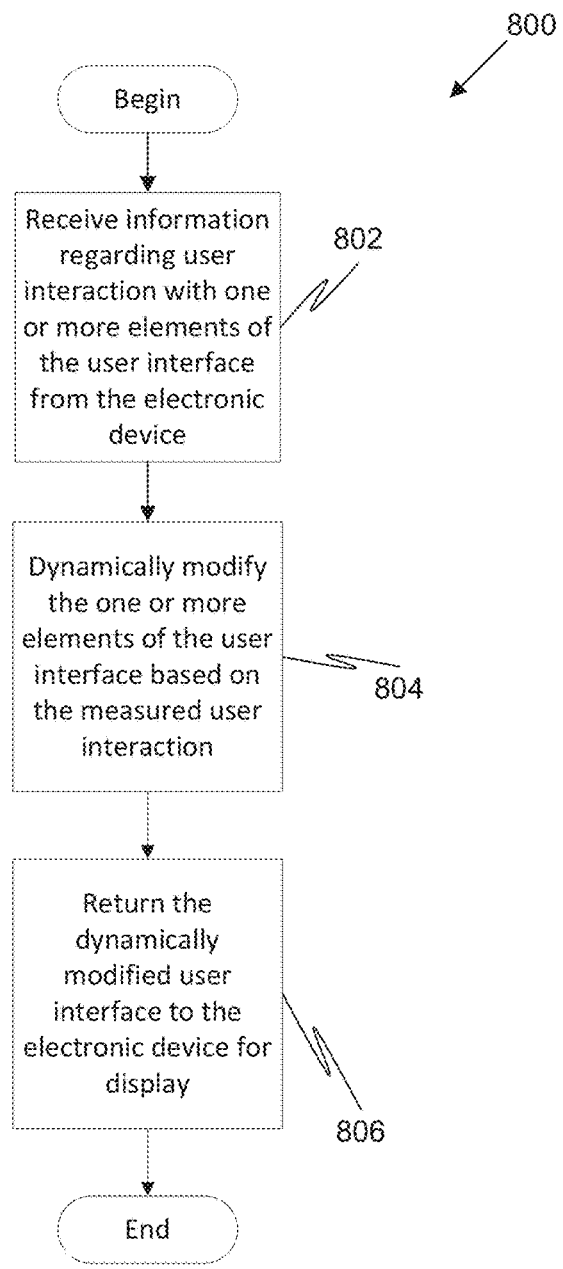
FIG. 8 is a flow diagram illustrating a method, in accordance with another example embodiment, of dynamically altering a user interface.

FIG. 8 is a flow diagram illustrating a method 800, in accordance with another example embodiment, of dynamically altering a user interface. At operation 802, information regarding user interaction with one or more elements of the user interface is received from an electronic device. At operation 804, one or more of the elements of the user interface are dynamically modified based on the measured user interaction. At operation 806, the dynamically modified user interface is returned to the electronic device for display.

Figure 9:
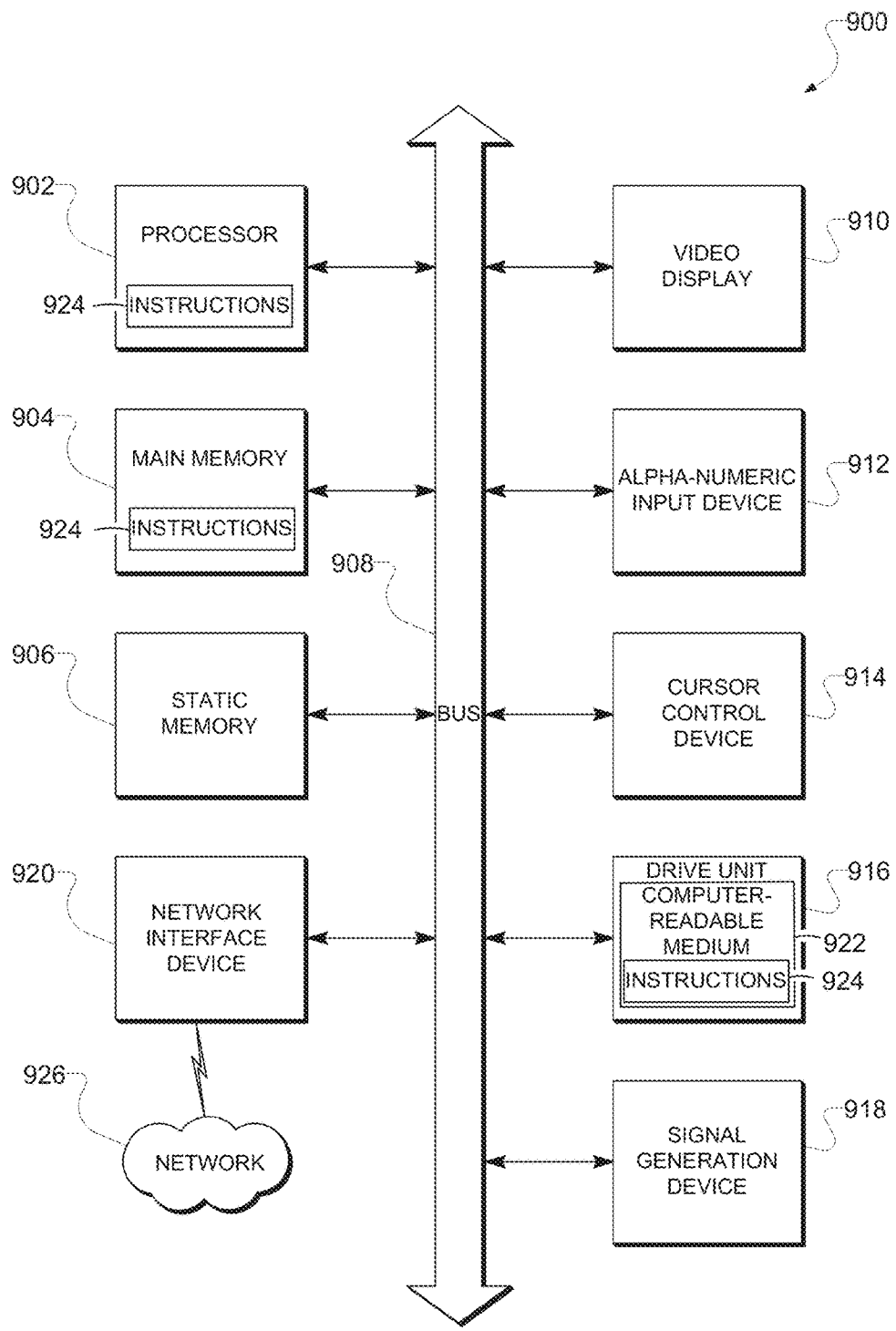
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine in the example form of a computer system within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a computer-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method of dynamically optimizing a user interface on an electronic device, the method comprising:
   upon navigation by a user to a particular web site, presenting a user interface to a user, the user interface including one or more elements;
   measuring user interaction with the one or more elements of the user interface over a fixed period, the user interaction includes finger presses on a touchscreen on which the user interface is operating, the measuring includes identifying patterns over time indicating a history of the finger presses in relation to the one or more elements; and
   identifying a first element of the user interface in which the patterns of finger presses over the fixed period indicate a lack of interest on the part of the user;
   identifying a second element of the user interface in which the patterns of the finger presses over the fixed period indicate interest on the part of the user;
   identifying a third element of the user interface in which the patterns of the finger presses over, the fixed period indicate interest on the part of the user, the third element being an element in which a finger press activates a field in which the user is expected to type information;
   dynamically modifying the user interface based both on the measured user interaction and on information about the user entered by the user, the dynamically modifying including removing the first element from the user interface, removing the second element from the user interface but presenting a fourth element of the same type as the second element but not identical to the second element in the user interface, and expanding a size of the third element in the user interface; and
   presenting the dynamically modified user interface upon a future navigation by the user to the particular web site.

2. The method of claim 1, wherein the dynamically modifying includes removing one or more elements of the user interface based on the user interaction.

3. The method of claim 1, wherein the dynamically modifying includes reducing a size of one or more of the elements of the user interface based on the user interaction.

4. The method of claim 1, wherein the dynamically modifying includes moving one or more elements of the user interface to a more prominent place on a display based on the user interaction.

5. The method of claim 1, wherein the dynamically modifying includes altering font size of one or more elements of the user interface based on the user interaction.

6. The method of claim 1, wherein the measuring includes measuring clicks by the user on the one or more elements of the user interface.

7. The method of claim 6, wherein the clicks involve finger presses on a touchscreen displaying the user interface.

8. The method of claim 1, wherein the information regarding the user is retrieved from a user profile.

9. The method of claim 1, wherein the informaion regarding the user is the user's age.

10. The method of claim 1, wherein the information regarding the user is the user's sex.

11. The method of claim 1, wherein the information regarding the user is a location of the user.

12. The method of claim 1, wherein the third element is a search box.

13. A method of dynamically optimizing a user interface on an electronic device, the method comprising:
 upon navigation by a user to a particular web site, delivering the user interface to the electronic device for display;
 receiving information regarding user interaction over a fixed period with one or more elements of the user interface from the electronic device, the user interaction includes finger presses on a touchscreen on which the user interface is operating, the measuring includes identifying patterns over time indicating a history of the finger presses in relation to the one or more elements;
 identifying a first element of the user interface in which the patterns of finger presses over the fixed period indicate a lack of interest on the part of the user;
 identifying a second element of the user interface in which the patterns of the finger presses over the fixed period indicate interest on the part of the user;
 identifying a third element of the user interface in which the patterns of the finger presses over the fixed period indicate interest on the part of the user, the third element being an element in which a finger press activates a field in which the user is expected to type information;
 dynamically modifying the user interface based on the information regarding user interaction and based on information about the user entered by the user, the dynamically modifying including removing the first element from the user interface, removing the second element from the user interface but presenting a fourth element of the same type as the second element but not identical to the second element in the user interface, and expanding a size of the third element in the user interface; and
 upon a future navigation by the user to the particular web site, returning the dynamically modified user interface to the electronic device for display.

14. The method of claim 13, wherein the dynamically modifying the one or more elements of the user interface is based also on information regarding the user interaction with one or more elements of the user interface received from one or more other electronic devices.

15. A user device comprising: a user interface having one or more elements;
 a processor;
 a user interaction tracking module to measure user interaction with the one or more elements of the user interface over a fixed period, the user interface presented upon navigation by a user to a particular web site, the user interaction includes finger presses on a touchscreen on which the user interface is operating, the measuring includes identifying patterns over time indicating a history of the finger presses in relation to the one or more elements, to identify a first element of the user interface in which the patterns of finger presses over the fixed period indicate a lack of interest on the part of the user, identify a second element of the user interface in which the patterns of the finger presses over the fixed period indicate interest on the part of the user, and identify a third element of the user interface in which the patterns of the finger presses over the fixed period indicate interest on the part of the user, the third element being an element in which a finger press activates a field in which the user is expected to type information; and
 a user interface modification module to dynamically modify the user interface based on the information regarding user interaction and based on information about the user entered by the user, the dynamically modifying including removing the first element from the user interface, removing the second element from the user interface but presenting a fourth element of the same type as the second element, but not identical to the second element in the user interface, and expanding a size of the third element in the user interface, and to present the dynamically modified user interface upon a future navigation by the user to the particular web site.

16. The user device of claim 15, further comprising a touchscreen, the user interaction tracking module measuring user interaction by tracking presses on the touchscreen.

17. A server comprising:
 a processor;
 a user interaction tracking module to receive information regarding user interaction with one or more elements of a user interface of an electronic device over a fixed period, the user interface presented upon navigation by a user to a particular web site, to identify a first element of the user Interface In which the patterns of finger presses over the fixed period indicate a lack of interest on the part of the user, identify a second element of the user interface in which the patterns of the finger presses over the fixed period indicate interest on the part of the user, and identify a third element of the user interface in which the patterns of the finger presses over the fixed period indicate interest on the part of the user, the third element being an element in which a finger press activates a field in which the user is expected to type information; and
 a user interface modification module to dynamically modify the user interface based on the information regarding user interaction and based on information about the user entered by the user, the dynamically modifying including removing the first element, from the user interface, removing the second element from the user interface but presenting a fourth element of the same type as the second element but not identical to the second element in the user interface, and expanding a size of the third element in the user interface, and to present the dynamically modified user interface upon a future navigation by the user to the particular web site.

18. The server of claim 17, wherein the server is a web server.

19. A non-transitory computer-readable storage medium comprising instructions that, when executed by at least one processor of a machine, cause the machine to perform operations comprising:
   upon navigation by a user to a particular web site, presenting a user interface to a user, the user interface includes one or more elements;
   measuring user interaction with the one or more elements of the user interface over a fixed period, the user interaction includes finger presses on a touchscreen on which the user interface is operating, the measuring includes identifying patterns over time indicating a history of the finger presses in relation to the one or more elements; and
   identifying a first element of the user interface in which the patterns of finger presses over the fixed period indicate a lack of interest on the part of the user;
   identifying a second element of the user interface in which the patterns of the finger presses over the fixed period indicate interest on the part of the user;
   identifying a third element of the user interface in which the patterns of the finger presses over the fixed period indicate interest on the part of the user, the third element being an element in which a finger press activates a field in which the user is expected to type information;
   dynamically modifying the user interface based both on the measured user interaction and information about the user entered by the user, the dynamically modifying including removing the first element from the user interface, removing the second element from the user interface but presenting a fourth element of the same type as the second element but not identical to the second element in the user interface, and expanding a size of the third element in the user interface; and presenting the dynamically modified user interface upon a future navigation by the user to the particular web site.

20. A non-transitory computer-readable storage medium comprising instructions that, when executed by at least one processor of a machine, cause the machine to perform operations comprising:
   receiving information regarding user interaction over a fixed period with one or more elements of the user interface from the electronic device, the user interaction includes finger presses on a touchscreen on which the user interface is operating, the measuring includes identifying patterns over time indicating a history of the finger presses in relation to the one or more elements;
   identifying a first element of the user interlace in which the patterns of finger presses over the fixed period indicate a lack of interest on the part of the user;
   identifying a second element of the user interface in which the patterns of the finger presses over the fixed period indicate interest on the part of the user;
   identifying a third element of the user interface in which the patterns of the finger presses over the fixed period indicate interest on the part of the user, the third element being an element in which a finger press activates a field in which the user is expected to type information;
   dynamically modifying the user interface based on the information regarding user interaction and based on information about the user entered by the user, the dynamically modifying including removing the first element from the user interface, removing the second element from the user interface but presenting a fourth element of the same type as the second element but not identical to the second element in the user interface, and expanding a size of the third element in the user interface; and
   returning the dynamically modified user interface to the electronic device for display.

* * * * *

UNITED STATES PATENT AND TRADEMARK OFFICE
CERTIFICATE OF CORRECTION

PATENT NO. : 9,652,777 B2
APPLICATION NO. : 13/681653
DATED : May 16, 2017
INVENTOR(S) : Tapley et al.

It is certified that error appears in the above-identified patent and that said Letters Patent is hereby corrected as shown below:

In the Claims

In Column 8, Line 48, in Claim 1, delete "over," and insert --over-- therefor

In Column 9, Line 18, in Claim 9, delete "informaion" and insert --information-- therefor In Column 10, Line 47, in Claim 17, delete "Interface In" and insert --interface in-- therefor In Column 12, Line 15, in Claim 20, delete "interlace" and insert --interface-- therefor Signed and Sealed this
Eighth Day of May, 2018

Andrei Iancu
*Director of the United States Patent and Trademark Office*